(12) United States Patent
Li et al.

(10) Patent No.: US 11,108,037 B2
(45) Date of Patent: Aug. 31, 2021

(54) METHOD FOR PREPARING GRAPHENE/TERNARY MATERIAL COMPOSITE FOR USE IN LITHIUM ION BATTERIES AND PRODUCT THEREOF

(71) Applicants: BEIJING TUNGHSU CARBON ADVANCED MATERIALS TECHNOLOGY CO., LTD., Beijing (CN); TUNGHSU GROUP CO., LTD., Shijiazhuang (CN)

(72) Inventors: Qing Li, Beijing (CN); Min Chen, Beijing (CN); Heran Li, Beijing (CN)

(73) Assignees: BEIJING TUNGHSU CARBON ADVANCED MATERIALS TECHNOLOGY CO., LTD., Beijing (CN); TUNGHSU GROUP CO., LTD., Shijiazhuang (CN)

( * ) Notice: Subject to any disclaimer, the term of this patent is extended or adjusted under 35 U.S.C. 154(b) by 59 days.

(21) Appl. No.: 16/474,209

(22) PCT Filed: Dec. 30, 2016

(86) PCT No.: PCT/CN2016/113790
§ 371 (c)(1),
(2) Date: Jun. 27, 2019

(87) PCT Pub. No.: WO2018/120147
PCT Pub. Date: Jul. 5, 2018

(65) Prior Publication Data
US 2019/0355978 A1 Nov. 21, 2019

(51) Int. Cl.
*H01M 4/36* (2006.01)
*H01M 4/485* (2010.01)
(Continued)

(52) U.S. Cl.
CPC ......... *H01M 4/364* (2013.01); *H01M 4/485* (2013.01); *H01M 4/587* (2013.01); *H01M 10/0525* (2013.01)

(58) Field of Classification Search
CPC ............. H01M 10/0525; H01M 4/131; H01M 4/1391; H01M 4/364; H01M 4/485;
(Continued)

(56) References Cited

U.S. PATENT DOCUMENTS 8,691,441 B2    4/2014  Zhamu et al.
10,367,188 B2 * 7/2019  Kawakami ............ H01M 4/625
(Continued)

FOREIGN PATENT DOCUMENTS

CN    104157845 A    11/2014
CN    104241615 A    12/2014
(Continued)

OTHER PUBLICATIONS

European Office Action for Application No. 16924912.5, dated Jun. 12, 2020, 9 pages.
(Continued)

*Primary Examiner* — Mark Kopec
*Assistant Examiner* — Jaison P Thomas
(74) *Attorney, Agent, or Firm* — McCarter & English, LLP; Steven G. Davis; Wei Song (57) ABSTRACT

Provided is a method for preparing a graphene/ternary material composite for use in lithium ion batteries, comprising the following preparation steps: (a) mixing a ternary material and a graphene oxide powder in an organic solvent to form a mixed dispersion; (b) adding a reducing agent to the mixed dispersion from step (a), and carrying out a reduction reaction at a reduction temperature of 80-160° C. while stirring, to obtain a reduction reaction mixture after a reduction time of 60-240 min; and (c) evaporating the solvent from the reduction reaction mixture from step (b) while stirring, and drying and then annealing the mixture at a low temperature in an inert atmosphere to obtain a graphene/ternary material composite having a three-dimensional network structure. Also provided is a graphene/ternary material composite prepared by using this method.

18 Claims, 5 Drawing Sheets

(51) Int. Cl.
*H01M 4/587* (2010.01)
*H01M 10/0525* (2010.01)

(58) Field of Classification Search
CPC ...... H01M 4/505; H01M 4/525; H01M 4/587; H01M 4/625; Y02E 60/10
See application file for complete search history.

(56) References Cited

U.S. PATENT DOCUMENTS

| | | | |
|---|---|---|---|
| 10,454,102 B2 * | 10/2019 | Ikenuma | H01M 4/1391 |
| 2015/0333320 A1 * | 11/2015 | Tamaki | H01M 4/525 |
| | | | 429/231.4 |
| 2018/0277829 A1 * | 9/2018 | Konishi | H01M 4/62 |

FOREIGN PATENT DOCUMENTS

| | | | |
|---|---|---|---|
| CN | 105070888 A | | 11/2015 |
| CN | 105489884 A | | 4/2016 |
| CN | 105742627 A | * | 7/2016 |
| CN | 105742627 A | | 7/2016 |
| JP | 2012-216515 A | | 11/2012 |
| JP | 2015-134706 A | | 7/2015 |
| JP | 2016-006767 A | | 1/2016 |

OTHER PUBLICATIONS

International Search Report and Written Opinion for Application No. PCT/CN2016/113790, dated Aug. 31, 2017, 7 pages.

* cited by examiner

METHOD FOR PREPARING GRAPHENE/TERNARY MATERIAL COMPOSITE FOR USE IN LITHIUM ION BATTERIES AND PRODUCT THEREOF

CROSS-REFERENCE TO RELATED APPLICATIONS

This application is a U.S. national stage filing, under 35 U.S.C. § 371(c), of International Application No. PCT/CN2016/113790, filed on Dec. 30, 2016. The entire contents of the aforementioned application are incorporated herein by reference.

TECHNICAL FIELD

The present invention relates to the technical field of lithium ion battery materials. In particular, the present invention relates to a method for preparing a graphene/ternary material composite for use in lithium ion batteries, and a product prepared by the method.

BACKGROUND

Lithium ion batteries are widely used in the fields of electronic products, electric vehicles, medical equipment, aerospace, etc. With the advancement of technologies, after the requirements of safety, cost, longevity and environmental protection are met, the key performance indicators of the lithium ion batteries are high energy density and fast discharge capability. At present, the cathode materials, $LiCoO_2$, $LiMn_2O_4$ and $LiFePO_4$, for commercialized lithium ion batteries have an actual maximum specific capacity of only 145 mAh/g, and also have the disadvantages of high cost, poor safety, poor consistency and the like. The ternary materials, such as nickel-cobalt-lithium manganese oxide composites, have a high capacity and an actual specific capacity of up to 200 mAh/g. They have the advantages of low cost, good stability, high safety and so on. Moreover, the ternary materials have a relatively low requirement on the environment and equipment, can be relatively easily prepared and processed, have high consistency and reliability, and thus can achieve high energy density. In recent years, some lithium cobalt oxides have been gradually replaced by the ternary materials. In the next five years, the ternary materials will be the mainstream of R&D and industrialization, and also will be the most promising cathode materials for next-generation power lithium ion batteries and high-energy density small-sized lithium ion batteries for electronic products.

Although the ternary materials have good electrochemical performances, there are still problems to be solved in terms of the practical applicability, for example, the disorder of high-nickel materials; the oxygen loss and phase transition caused by dilithiation in the first cycle, resulting in poor initial effect; low conductivity, poor performance at a high rate, and so on. In order to solve these problems, researchers have done a lot of solid research works ranging from the method for preparing materials to the modification of materials. Carbon modification has become one of the most popular directions for improving the rate performance of materials. Recently, papers and patent applications regarding the modification of lithium iron phosphate with graphene have been reported frequently, while papers and patent applications regarding the modification of ternary materials with graphene are relatively rare. This is mainly because graphene has the best dispersibility in aqueous solvents, while the ternary materials, especially high-nickel materials, have on their surfaces a small amount of lithium oxide which absorbs water to form lithium hydroxide continuing to absorb water to form hydrated lithium hydroxide which then reacts with carbon dioxide to form lithium carbonate. Therefore, the modification of the ternary materials is carried out preferably by using an organic solvent, so as to avoid the adverse effects of water on the ternary materials.

At present, there are two main ways for the modification of ternary materials with graphene. One way is to modify the ternary materials directly by using graphene as a raw material, and for this way, a commercial method is to directly use graphene as a conductive agent. In this way, the content of graphene is generally less than 2%, and the rate performance is improved. Another way is to modify the ternary materials with graphene oxide as a raw material. The related patents and patent applications are as follows: in the patent for which the patent right was granted in 2015 with the granted publication No. CN103500826B, graphite oxide is functionalized with methyl blue, and then a reduction reaction is performed to obtain a hydrophilically-modified graphene, thereby modifying the positive electrode materials. In the patent application which was published in 2015 with the publication No. CN104852053A, graphene oxide is added in the preparation of the precursor, but this is limited to the preparation of the precursor only. In the patent application which was published in 2014 with the publication No. CN104157845A, the composite of graphene oxide and a ternary material is dispersed in an organic solvent, and then calcined at a high temperature in a reducing atmosphere after hydrothermal synthesis. In this way, the rate performance of the sample is improved as compared to that of the unmodified sample, but the overall rate performance is poor, wherein the 5 C rate performance reaches only 60 mAh/g. The method is not suitable for industrial production.

Therefore, there is a need for a novel method for modifying ternary materials with graphene and a product prepared by the method. In particular, there is a need for a method and product that can improve the rate performance and/or cycling performance of the ternary materials more effectively. More advantageously, there is a need for a method and product that is simple in process, environmentally friendly, and/or suitable for industrial production.

SUMMARY OF THE INVENTION

In the first aspect, the present invention relates to a method for preparing a graphene/ternary material composite for use in lithium ion batteries, comprising the steps of:

(a) mixing a ternary material with a graphene oxide powder in an organic solvent to form a mixed dispersion;

(b) adding a reducing agent to the mixed dispersion from step (a), and carrying out a reduction reaction at a reduction temperature of 80-160° C. while stirring, to obtain a reduction reaction mixture after a reduction time of 60-240 min; and (c) evaporating the solvent from the reduction reaction mixture from step (b) while stirring, and drying and then annealing the mixture at a low temperature in an inert atmosphere to obtain a graphene/ternary material composite having a three-dimensional network structure.

In the second aspect, the present invention relates to a graphene/ternary material composite for use in lithium ion batteries prepared by the method of the present invention.

The present invention has one or more of the following advantages: 1. the high mechanical flexibility of the graphene sheet layer can provide lubrication effect, thereby improving the compaction density of the ternary material particles; 2. the graphene sheet layer relieves the external stress, and thus reduces the crushing of the secondary particles in the rolling and cycling processes; 3. the graphene nanosheet layer structure forms an efficient three-dimensional conductive network, which ameliorates the deterioration of conductivity caused by the formation of a fresh particle surface after the crushing or pulverization of the secondary particles, and meanwhile ensures the conductive contact of the particles during the cycle, greatly improving the rate performance and cycling performance of the ternary materials; 4. the chemical reduction method employed is simple in process, relatively low in cost as compared to the heating reduction method, environmentally friendly, and suitable for industrial production. Therefore, the present invention provides a graphene/ternary material composite having a three-dimensional network structure and a method for preparing the same in a cost-effective manner, which improve the lithium ion diffusion coefficient and/or electronic conductivity of the ternary material for lithium ion batteries, and/or suppress the capacity decay of the material during the high rate discharging.

BRIEF DESCRIPTION OF THE DRAWINGS

The present invention is illustrated in detail with reference to the following detailed description and the accompanying drawings, so as to enable those skilled in the art to obtain a better understanding of the present invention. However, they cannot to be construed as limiting the scope of the present invention in any way.

DETAILED DESCRIPTION OF THE INVENTION

The present invention provides the following embodiments:

1. A method for preparing a graphene/ternary material composite for use in lithium ion batteries, comprising the steps of:
   (a) mixing a ternary material with a graphene oxide powder in an organic solvent to form a mixed dispersion;
   (b) adding a reducing agent to the mixed dispersion from step (a), and carrying out a reduction reaction at a reduction temperature of 80-160° C. while stirring, to obtain a reduction reaction mixture after a reduction time of 60-240 min; and
   (c) evaporating the solvent from the reduction reaction mixture from step (b) while stirring, and drying and then annealing the mixture at a low temperature in an inert atmosphere to obtain a graphene/ternary material composite having a three-dimensional network structure.

2. The method of item 1, wherein the reducing agent is one or more selected from the group consisting of hydrazine reducing agents, weak acids, phenols, metal hydride reducing agents, strong bases, reducing sugars, alcohols, sodium dithionite, $H_2$ and hydroiodic acid.

3. The method of item 1 or 2, wherein the reducing agent is one or more selected from the group consisting of hydrazine hydrate, dimethyl hydrazine, phenylhydrazine, p-methylsulfonyl hydrazide, ascorbic acid, pyrogallic acid, hydroquinone, tea polyphenol, sodium borohydride, lithium aluminum hydride, sodium hydroxide, potassium hydroxide, aqueous ammonia, glucose, fructose, sucrose, alcohols, sodium dithionite, $H_2$ and hydroiodic acid.

4. The method of any one of items 1-3, wherein step (a) further comprises the steps of:
   (a1) adding the graphene oxide powder to the organic solvent to obtain a uniformly dispersed graphene oxide dispersion; and
   (a2) adding the ternary material to the graphene oxide dispersion to form a mixed dispersion.

5. The method of item 4, wherein in step (a1), the uniformly dispersed graphene oxide dispersion is obtained by ultrasonic dispersion.

6. The method of any one of items 4-5, wherein the graphene oxide dispersion obtained in step (a1) has a concentration of 0.1-5 g/L.

7. The method of any one of items 4-6, wherein in step (a2), the ternary material is added to the graphene oxide dispersion in 2-6 portions.

8. The method of any one of items 4-7, wherein in step (a2), the ternary material is sufficiently mixed with the graphene oxide by physical mixing to form a mixed dispersion, wherein the physical mixing is one or more selected from the group consisting of stirring, sonication, ball milling, and cell discruption.

9. The method of any one of items 1-8, wherein the mass ratio of the ternary material to the graphene oxide is 1:20-1:200.

10. The method of any one of items 1-9, wherein the mass ratio of the graphene oxide to the reducing agent is 1:1-1:100.

11. The method of any one of items 1-10, wherein the organic solvent in step (a) is one or more selected from the group consisting of ethanol, N-methylpyrrolidone (NMP), N,N-dimethylformamide (DMF), methanol, propanol, isopropanol, n-butanol, ethylene glycol, glycerol, acetone, and n-propanol.

12. The method of any one of items 1-11, wherein the reduction reaction mixture is purified before evaporating the solvent from the reduction reaction mixture from step (b) while stirring.

13. The method of any one of items 1-12, wherein the annealing in step (c) is conducted at a temperature of 150-350° C.

14. The method of any one of items 1-13, wherein the annealing in step (c) is conducted for 1-5 h.

15. The method of any one of items 1-14, wherein the annealing at a low temperature in step (c) is carried out in a tube furnace.

16. The method of any one of items 1-15, further comprising a pre-treatment prior to step (a), in which the pre-treatment comprises drying the ternary material and the graphene oxide powder at 120-200° C. for 1-3 h.

17. The method of any one of items 1-16, wherein the ternary material is one or more selected from the group consisting of nickel-cobalt-manganese ternary materials, nickel-cobalt-aluminum ternary materials, and lithium-rich ternary materials.

18. A graphene/ternary material composite for use in lithium ion batteries prepared by the method according to any one of items 1-17.

Ternary Material

The ternary material for use in lithium ion batteries was first reported in 1999 as a nickel-cobalt-manganese ternary transition metal oxide composite having a structural formula of $LiNi_{1-x-y}Co_xMn_yO_2$ (0<x<0.5, and 0<y<0.5). The material offers combined advantages such as the good cycling performance of $LiCoO_2$, the high specific capacity of $LiNiO_2$, and the high safety and low cost of $LiMnO_2$.

According to one embodiment of the present invention, the ternary material is one or more selected from the group consisting of nickel-cobalt-manganese ternary materials, nickel-cobalt-aluminum ternary materials, and lithium-rich ternary materials. Preferably, the nickel-cobalt-manganese ternary material has a structural formula of $LiNi_{1-x-y}Co_xMn_yO_2$ (0<x<0.5, and 0<y<0.5). In one embodiment, the nickel-cobalt-manganese ternary material is one or more selected from the group consisting of $LiNi_{1/3}Co_{1/3}Mn_{1/3}O_2$ (Type 333), $LiNi_{0.5}Co_{o3}Mn_{0.2}O_2$ (Type 532), $LiNi_{0.4}CO_{0.4}Mn_{0.2}O_2$ (Type 442), $LiNi0.6Co0.2Mn0.2O_2$ (Type 611), and $LiNi_{0.8}CO_{0.10}Mn_{0.10}O_2$ (Type 811) ternary materials. According to another embodiment of the present invention, the nickel-cobalt-aluminum ternary material is one or more selected from the group consisting of $LiNi_{0.5}CO_{0.3}Al_{0.2}O_2$ (Type 532), $LiNi_{0.6}CO_{0.2}Al_{0.2}O_2$ (Type 611), and $LiNi_{0.8}CO_{0.10}Al_{0.10}O_2$ (Type 811).

According to one embodiment of the present invention, the ternary material is present in the form of powder. Preferably, the ternary material is present in the form of crystalline powder. In one embodiment, the ternary material crystal belongs to the hexagonal crystal system with an α-$NaFeO_2$-type layered structure and a space group of R3m, wherein $Li^+$ and the transition metal ions alternately occupy positions 3a (0,0,0) and 3b (0,0,1/2), and $O^{2-}$ is located at position 6c (0,0,z). The 0 at position 6c is cubic close-packed, and the transition metal layer is composed of Ni, Mn, and Co. Each transition metal atom is surrounded by 6 oxygen atoms to form an $MO_6$ octahedral structure. The transition metal ion at position 3b and Li at position 3a alternately occupy the voids of the octahedron, and $Li^+$ is intercalated between the $LiNi_{1-x-y}Co_xMn_yO_2$ layers formed of the transition metal atoms and oxygen.

Due to the different ratios of transition metals, the ternary material has different electrochemical properties. Generally, an increase in Co content is beneficial to stabilization of the layered structure of the compound, thereby improving the cycling performance; an increase in Ni content can achieve a higher capacity, but will result in deteriorated cycling performance; and the incorporation of Mn can reduce the cost and improve the stability of the matrix, but excess Mn will lead to the formation of a spinel phase, thereby destroying the layered structure.

Graphene Oxide

Graphene, a two-dimensional free-state atomic crystal, is the basic structural unit for constructing zero-dimensional fullerene, one-dimensional carbon nanotubes and three-dimensional graphite. It has special physical and chemical properties such as high electrical conductivity, high thermal conductivity, high hardness and high strength, and thus can find broad application in the fields of electronics, information, energy, material and biomedicine. However, the application of graphene is limited since it is hydrophobic and prone to agglomeration due to the strong van der Waals force. The emergence of graphene oxide well solves the above problems.

Graphene oxide is an oxide of graphene, and has substantially the same structure as graphene, except that a large number of oxygen-containing groups are attached to the base surface that is composed of one layer of carbon atoms and infinitely extends in the two-dimensional space, —OH and C—O—C are present in the plane, and C=O and COOH are contained at the edges of the sheet. As compared to graphene, graphene oxide has more excellent properties including not only good wettability and surface activity, but also the ability of being peeled off after intercalation of small molecules or polymers. It plays a very important role in improving the comprehensive performances of materials such as the thermal, electrical and mechanical properties.

According to one embodiment of the present invention, the graphene oxide is present in the form of powder.

Graphene/Ternary Material Composite

In the present invention, a graphene/ternary material composite for use in lithium ion batteries is prepared by a chemical reduction method using graphene oxide and a ternary material as raw materials in the presence of a reducing agent.

According to one embodiment of the present invention, the method for preparing a graphene/ternary material composite for use in lithium ion batteries comprises the following steps:

(a) mixing a ternary material with a graphene oxide powder in an organic solvent to form a mixed dispersion;

(b) adding a reducing agent to the mixed dispersion from step (a), and carrying out a reduction reaction at a reduction temperature of 80-160° C., preferably 90-140° C., and more preferably 100-120° C. while stirring, to obtain a reduction reaction mixture after a reduction time of 60-240 min, preferably 80-200 min, and more preferably 100-150 min; and (c) evaporating the solvent from the reduction reaction mixture from step (b) while stirring, and drying and then annealing the mixture at a low temperature in an inert atmosphere to obtain a graphene/ternary material composite having a three-dimensional network structure.

According to one embodiment of the present invention, the reducing agent is selected from the group consisting of hydrazine reducing agents (such as hydrazine hydrate, dimethyl hydrazine, phenylhydrazine, p-methylsulfonyl hydrazide, etc.), weak acids and phenols (such as ascorbic acid, pyrogallic acid, hydroquinone, tea polyphenol, etc.), metal hydride reducing agents (such as sodium borohydride, lithium aluminum hydride, etc.), strong bases (such as sodium hydroxide, potassium hydroxide, aqueous ammonia, etc.), reducing sugars (such as glucose, fructose, sucrose, etc.), alcohols, sodium dithionite, $H_2$, hydroiodic acid, etc.

According to one embodiment of the present invention, step (a) further comprises the steps of:

(a1) adding the graphene oxide powder to the organic solvent to obtain a uniformly dispersed graphene oxide dispersion preferably by ultrasonic dispersion, wherein the graphene oxide dispersion preferably has a concentration of 0.1-5 g/L, more preferably 0.5-4 g/L, and even more preferably 1-3 g/L; and (a2) adding the ternary material to the graphene oxide dispersion to form a mixed dispersion. Preferably, the ternary material is added to the graphene oxide dispersion in 2-6 portions. Preferably, the ternary material is sufficiently mixed with the graphene oxide by physical mixing to form a mixed dispersion, wherein the physical mixing is one or more selected from the group consisting of stirring, sonication, ball milling, and cell discruption.

According to one embodiment of the present invention, the mass ratio of the ternary material to the graphene oxide is 1:20-1:200, preferably 1:50-1:150, and more preferably 1:80-1:120.

According to one embodiment of the present invention, the mass ratio of the graphene oxide to the reducing agent is 1:1-1:100, preferably 1:10-1:80, more preferably 1:20-1:80, and even more preferably 1:30-1:50.

According to one embodiment of the present invention, the organic solvent in step (a) is one or more selected from the group consisting of ethanol, N-methylpyrrolidone (NMP), N,N-dimethylformamide (DMF), methanol, propanol, isopropanol, n-butanol, ethylene glycol, glycerol, acetone, and n-propanol.

According to one embodiment of the present invention, the reduction reaction mixture is purified before evaporating the solvent from the reduction reaction mixture from step (b) while stirring. For example, the reduction reaction mixture from step (b) can be purified by centrifugation, washing (for example, washing with ethanol, acetone, or the like), removal of impurities or the like, to obtain a relatively thin paste mixture.

According to one embodiment of the present invention, the annealing at a low temperature in step (c) refers to a heat treatment process in which the reaction is heated to a certain annealing temperature for a sufficient annealing time, and then cooled at a suitable rate (slow cooling or controlled cooling). The annealing at a low temperature can further reduce the number of oxygen-containing functional groups, increase the purity of graphene, and improve the electrical conductivity. Moreover, the annealing can change the distribution of residual oxygen atoms on the surface of graphene, so that the oxygen atoms can be regularly gathered together, while there are still pure graphene voids left, thereby keeping the original structure of graphene unchanged and avoiding defects. Preferably, the annealing temperature is 150-350° C., preferably 160-300° C., and more preferably 180-250° C. Preferably, the annealing time is 1-5 h, preferably 2-4 h, and more preferably 2.5-3.5 h.

According to one embodiment of the present invention, the annealing at a low temperature in step (c) is carried out in a tube furnace.

According to one embodiment of the present invention, the method further comprises a pre-treatment prior to step (a), wherein the pre-treatment comprises drying the ternary material and the graphene oxide powder at 120-200° C. for 1-3 h. After being cooled, the dried powder can be used directly or placed in a dryer for later use.

The graphene/ternary material composite for use in lithium ion batteries prepared by the method of the present invention has excellent rate performance and cycling performance. Without wishing to be bound by theory, it is believed that the addition of graphene does not alter the crystal structure of the ternary material. The graphene/ternary material composite according to the present invention has an α-NaFeO$_2$-type layered structure and a space group of R3m, with R≥1.2 (R=I003/I004), indicating that the material has a lower degree of Ni$^+$ and Li$^+$ disorder, a better hexagonal layered structure and a higher degree of crystallization. Moreover, the presence of graphene in the three-dimensional network structure further improves the electrical conductivity and mechanical properties of the material, resulting in a material having better rate performance and cycling performance.

EXAMPLES

Certain specific embodiments of the present invention will be illustrated below with reference to the examples, so that those skilled in the art can obtain a more clear understanding of the technical solutions of the present invention and the advantages thereof. The examples should not be construed as limiting the present invention in any way.

The following raw materials were used in the examples:

Graphene oxide: XT-100, available from Tunghsu Carbon Advanced Materials Technology Co., Ltd.

Ternary material: 2016SY130, available from Xiamen Tungsten Co., Ltd.

Hydrazine hydrate: available from J&K Scientific Co., Ltd. (CAS: 10217-52-4)

Ascorbic acid: available from J&K Scientific Co., Ltd. (CAS: 50-81-7)

Ketjenblack: available from Sinopharm Chemical Reagent Co., Ltd. (1333-86-4)

PVDF: Polyvinylidene fluoride, available from J&K Scientific Co., Ltd. (CAS: 24937-79-9)

Example 1

250 ml of a solution containing 25 mg of graphene oxide in ethanol was prepared and ultrasonically dispersed for 2 h. 5 g of ternary material powder was added to the above mixed solution, and stirred at a stirring speed of 180 rpm for 30 min. 0.25 g of hydrazine hydrate was added dropwise to the solution, and the solution was heated at a temperature of 90° C. for 120 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at a temperature of 150° C. in an inert atmosphere for 3 h, to obtain a graphene/ternary material composite.

Electrochemical Performance Test:

First, a battery was assembled as follows. The graphene/ternary material composite, Ketjenblack and PVDF were weighed at a ratio of 90:5:5. N-methylpyrrolidone was added to a small volumetric flask and stirred uniformly to give an electrode slurry. The electrode slurry was uniformly coated onto an aluminum foil, and then dried in a vacuum oven at a temperature of 105° C. for 12 h. It was punched into a Φ 12 mm electrode sheet and placed into a glovebox. A CR2032 button battery was assembled by using the electrode sheet as a working electrode, metal lithium as a counter electrode, Celgard2400 as a separator, and 1M/LLiPF6/EC:DEC:DMC (at a volume ratio of 1:1:1) as an electrolyte.

Then, a constant current charging-discharging test was performed at room temperature, with a test voltage in the range of 3.0-4.3 V. The rate performance test comprised three cycles at 0.2 C; then constant current charging at 0.5 C, 1.0 C, 2.0 C, 3.0 C, 5.0 C and 10.0 C, constant voltage charging at 4.3V, and then constant current discharging at 0.5 C, 1.0 C, 2.0 C, 3.0 C, 5.0 C and 10.0 C, 5 cycles for each rate. The cycling performance test comprised three cycles at 0.2 C; then 80 cycles of constant current charging at 3 C, constant voltage charging at 4.3V, and discharging at 1 C.

Figure 1:
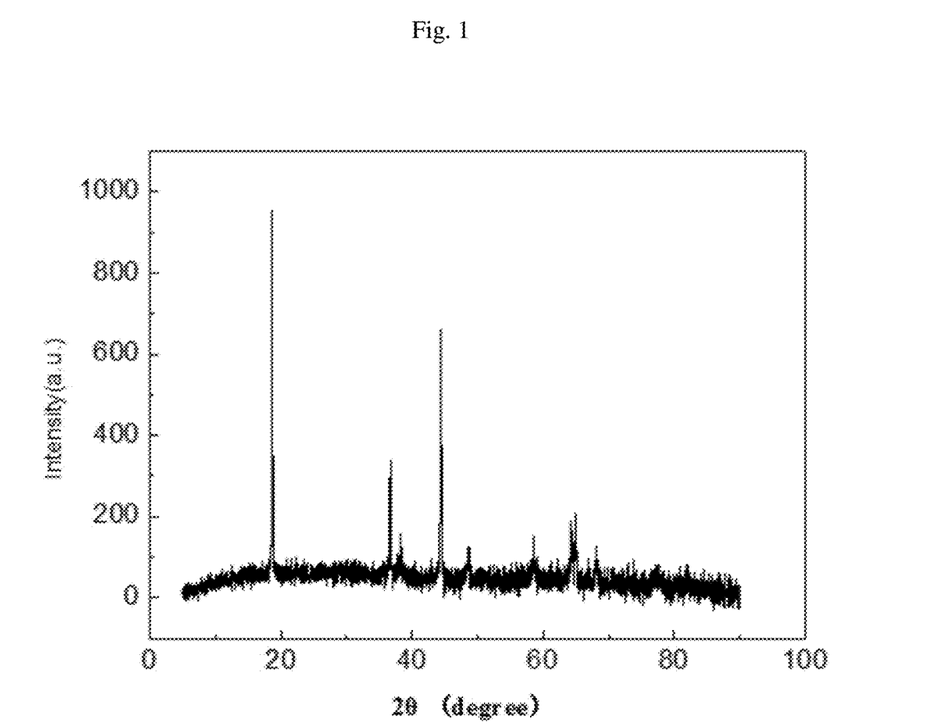
FIG. 1 shows an XRD pattern of a graphene/ternary material composite according to one embodiment of the present invention.
Figure 2:
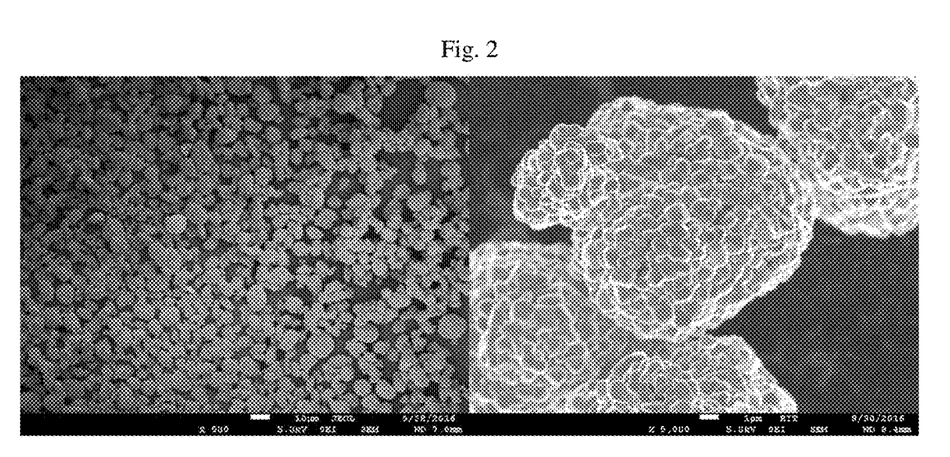
FIG. 2 shows an SEM photograph of a ternary material according to one embodiment of the present invention.
Figure 3:
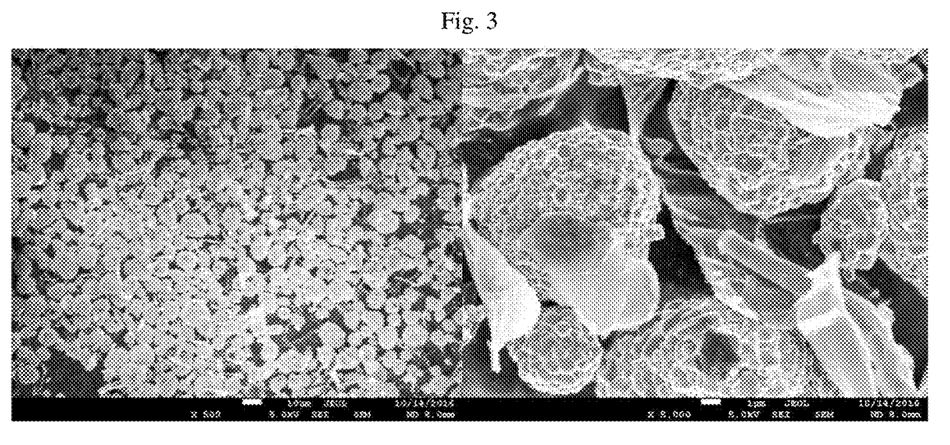
FIG. 3 shows an SEM photograph of a graphene/ternary material composite according to one embodiment of the present invention.
Figure 4:
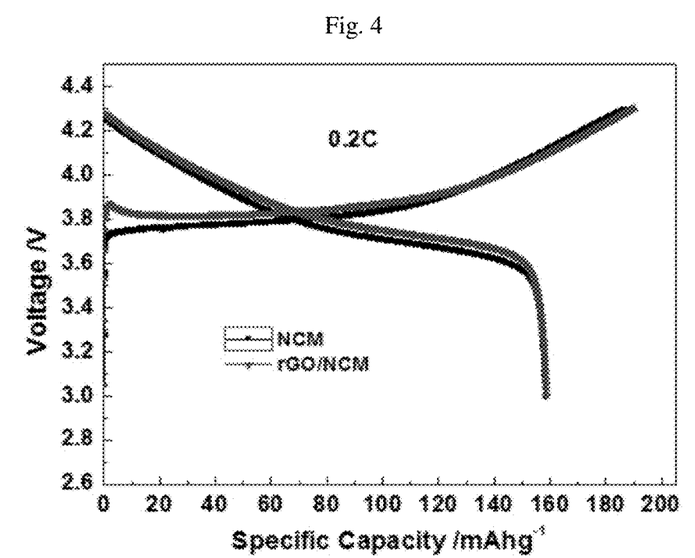
FIG. 4 shows comparison of charging and discharging curves before and after the addition of graphene according to one embodiment of the present invention.
Figure 5:
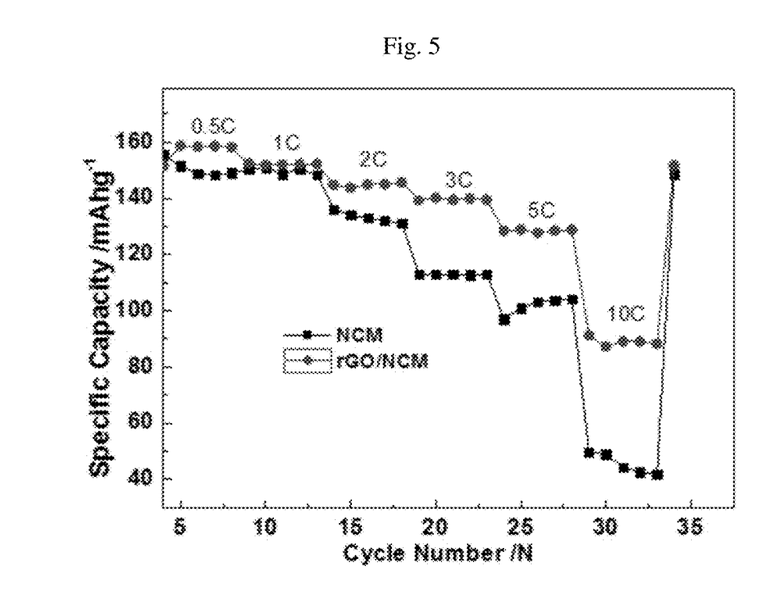
FIG. 5 shows comparison of capacity curves at different rates before and after the addition of graphene according to one embodiment of the present invention.
Figure 6:
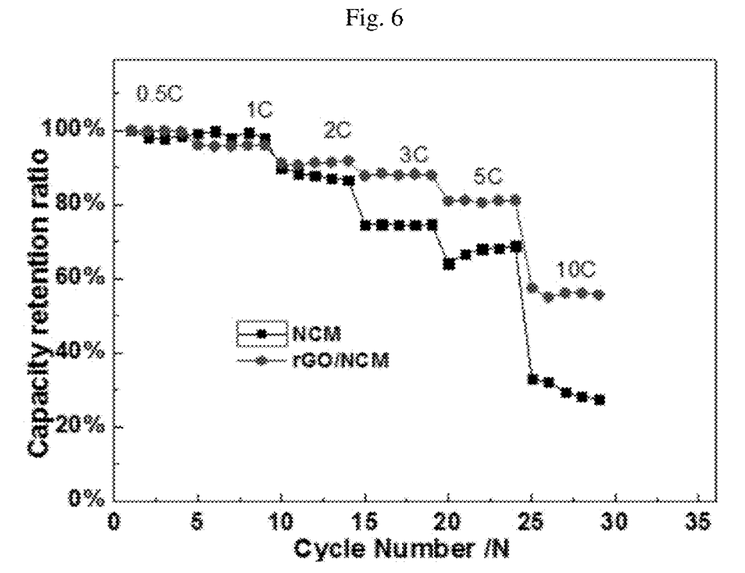
FIG. 6 shows comparison of capacity retention ratio curves at different rates before and after the addition of graphene according to one embodiment of the present invention.
Figure 7:
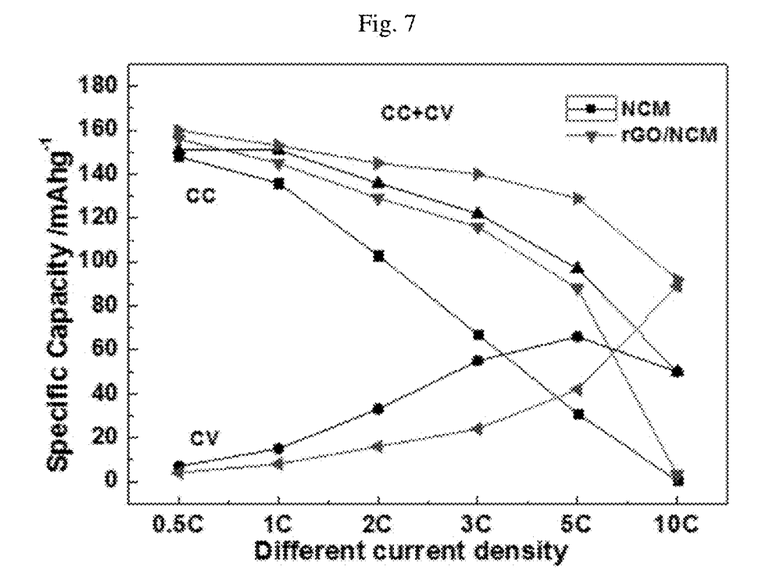
FIG. 7 shows comparison of capacity curves at different charging states at different rates before and after the addition of graphene according to one embodiment of the present invention.
Figure 8:
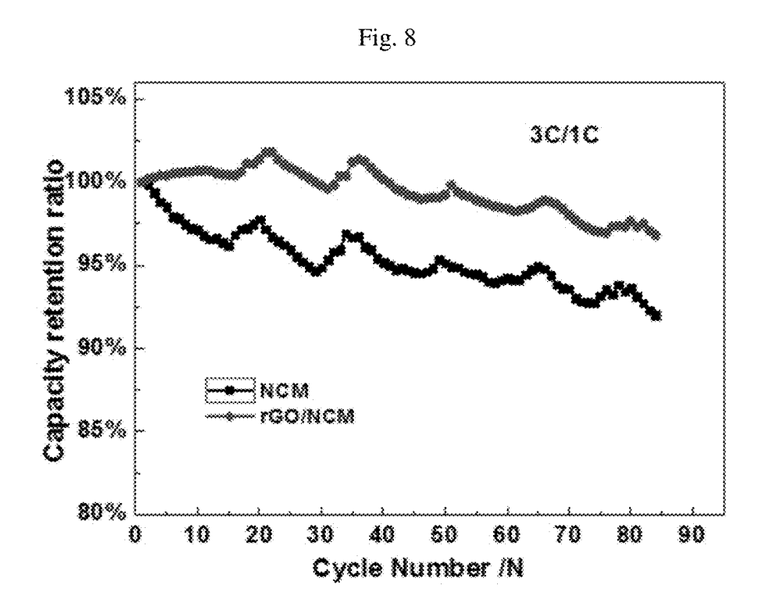
FIG. 8 is a graph showing the cycling capacities before and after the addition of graphene according to one embodiment of the present invention.
Figure 9:
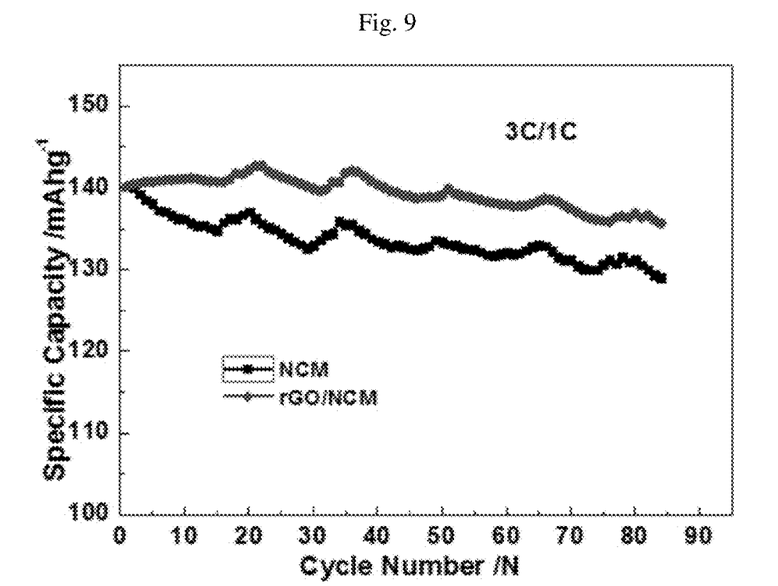
FIG. 9 is a graph showing the cycling capacity retention ratios before and after the addition of graphene according to one embodiment of the present invention.

FIG. 1 is an XRD pattern of the graphene/ternary material composite prepared in Example 1, showing that the crystal structure of the composite is intact. FIG. 2 is an SEM photograph of the raw material of the ternary material. FIG. 3 is an SEM photograph of the graphene/ternary material composite prepared in Example 1, indicating that graphene is uniformly dispersed on or attached to the ternary material particles, and graphene in the figure constitutes a three-dimensional conductive network structure. The electrochemical performance test showed that the graphene/ternary material composite prepared by the method of the present invention had an initial capacity comparable to the ternary material as the raw material; a 5 C capacity of about 130 mAh/g, which was 30% higher than that of the raw material; and a 10 C capacity of 90 mAh/g, which was 1.0 times higher than that of the raw material, wherein the capacity for constant current charging at 5 C was increased by 73% as compared to the raw material. Before and after the addition of graphene, the capacity retention ratios at 80 cycles of 3 C/1 C were 91% and 98%, respectively, as shown in FIGS. 4-9.

Example 2

50 ml of a solution containing 50 mg of graphene oxide in ethanol was prepared and ultrasonically dispersed for 2 h. 5 g of ternary material powder was added to the above mixed solution, and stirred at a stirring speed of 180 rpm for 30 min. 1 g of hydrazine hydrate was added dropwise to the solution, and the solution was heated at a temperature of 100° C. for 100 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at an annealing temperature of 150° C. in an inert atmosphere for 3 h, to obtain a graphene/ternary material composite. The electrochemical performance test conducted in the same manner as described in Example 1 showed that the graphene/ternary material composite as prepared above had an initial capacity comparable to the ternary material as the raw material; a 5 C capacity of about 126 mAh/g, which was 27% higher than that of the raw material; and a 10 C capacity of 86 mAh/g, which was 0.8 times higher than that of the raw material, wherein the capacity for constant current charging at 5 C was increased by 69% as compared to the raw material. Before and after the addition of graphene, the capacity retention ratios at 80 cycles of 3 C/1 C were 91% and 97%, respectively.

Example 3

50 ml of a solution containing 150 mg of graphene oxide in ethanol was prepared and ultrasonically dispersed for 2 h. 5 g of ternary material powder was added to the above mixed solution, and stirred at a stirring speed of 180 rpm for 30 min. 4.5 g of hydrazine hydrate was added dropwise to the solution, and the solution was heated at a temperature of 100° C. for 90 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at an annealing temperature of 200° C. in an inert atmosphere for 4 h, to obtain a graphene/ternary material composite. The electrochemical performance test conducted in the same manner as described in Example 1 showed that the graphene/ternary material composite as prepared above had an initial capacity comparable to the ternary material as the raw material; a 5 C capacity of about 133 mAh/g, which was 31% higher than that of the raw material; and a 10 C capacity of 93 mAh/g, which was 0.8 times higher than that of the raw material, wherein the capacity for constant current charging at 5 C was increased by 75% as compared to the raw material. Before and after the addition of graphene, the capacity retention ratios at 80 cycles of 3 C/1 C were 91% and 97%, respectively.

Example 4

50 ml of a solution containing 250 mg of graphene oxide in ethanol was prepared and ultrasonically dispersed for 2 h. 5 g of ternary material powder was added to the above mixed solution, and stirred at a stirring speed of 180 rpm for 30 min. 12.5 g of hydrazine hydrate was added dropwise to the solution, and the solution was heated at a temperature of 120° C. for 80 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at an annealing temperature of 200° C. in an inert atmosphere for 5 h, to obtain a graphene/ternary material composite. The electrochemical performance test conducted in the same manner as described in Example 1 showed that the graphene/ternary material composite as prepared above had an initial capacity comparable to the ternary material as the raw material; a 5 C capacity of about 125 mAh/g, which was 24% higher than that of the raw material; and a 10 C capacity of 79 mAh/g, which was 0.4 times higher than that of the raw material, wherein the capacity for constant current charging at 5 C was increased by 65% as compared to the raw material. Before and after the addition of graphene, the capacity retention ratios at 80 cycles of 3 C/1 C were 91% and 92%, respectively.

Example 5

250 ml of a solution containing 25 mg of graphene oxide in ethanol was prepared and ultrasonically dispersed for 2 h. 5 g of ternary material powder was added to the above mixed solution, and stirred at a stirring speed of 180 rpm for 30 min. 0.08 g of ascorbic acid was added to the solution, and the solution was heated at a temperature of 80° C. for 240 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at an annealing temperature of 300° C. in an inert atmosphere for 2 h, to obtain a graphene/ternary material composite. The electrochemical performance test conducted in the same manner as described in Example 1 showed that the graphene/ternary material composite as prepared above had an initial capacity comparable to the ternary material as the raw material; a 5 C capacity of about 125 mAh/g, which was 26% higher than that of the raw material; and a 10 C capacity of 85 mAh/g, which was 0.5 times higher than that of the raw material, wherein the capacity for constant current charging at 5 C was increased by 90% as compared to the raw material. Before and after the addition of graphene, the capacity retention ratios at 80 cycles of 3 C/1 C cycle were 90% and 91%, respectively.

Example 6

50 ml of a solution containing 50 mg of graphene oxide in NMP was prepared and ultrasonically dispersed for 2 h. 5 g of ternary material powder was added to the above mixed solution, and stirred at a stirring speed of 180 rpm for 30 min. 0.50 g of ascorbic acid was added to the solution, and the solution was heated at a temperature of 120° C. for 120 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at an annealing temperature of 300° C. in an inert atmosphere for 2 h, to obtain a graphene/ternary material composite. The electrochemical performance test conducted in the same manner as described in Example 1 showed that the graphene/ternary material composite as prepared above had an initial capacity comparable to the ternary material as the raw material; a 5 C capacity of about 130 mAh/g, which was 30% higher than that of the raw material; and a 10 C capacity of 90 mAh/g, which was 0.8 times higher than that of the raw material, wherein the capacity for constant current charging at 5 C was increased by 69% as compared to the raw material. Before and after the addition of graphene, the capacity retention ratios at 80 cycles of 3 C/1 C were 90% and 95%, respectively.

Example 7

50 ml of a solution containing 50 mg of graphene oxide in DMF was prepared and ultrasonically dispersed for 2 h. 5 g of ternary material powder was added to the above mixed solution, and stirred at a stirring speed of 180 rpm for 30 min. 1 g of ascorbic acid was added dropwise to the solution, and the solution was heated at a temperature of 160° C. for 60 min. After being cooled, the above mixed solution after reaction was washed with ethanol and centrifuged to obtain a relatively thin paste. The paste was placed in a beaker, and oven-dried while stirring. The dried powder was placed in a tube furnace and annealed at an annealing temperature of 300° C. in an inert atmosphere for 2 h, to obtain a graphene/ternary material composite. The electrochemical performance test conducted in the same manner as described in Example 1 showed that the graphene/ternary material composite as prepared above had an initial capacity comparable to the ternary material as the raw material; a 5 C capacity of about 133 mAh/g, which was 31% higher than that of the raw material; and a 10 C capacity of 92 mAh/g, which was 1.0 times higher than that of the raw material, wherein the capacity for constant current charging at 5 C was increased by 73% as compared to the raw material. Before and after the addition of graphene, the capacity retention ratios at 80 cycles of 3 C/1 C were 90% and 98%, respectively.

Although the present invention has been described above in connection with the accompanying drawings, the present invention is not limited to the specific embodiments described above. The specific embodiments described above are merely illustrative and not restrictive. In view of the teachings of the present invention, those of ordinary skill in the art can make some changes and modifications to the above embodiments without departing from the spirit of the present invention. Such changes and modifications are all within the protection scope of the present invention.

What is claimed is:

1. A graphene/ternary material composite for use in lithium ion batteries, wherein the graphene/ternary material composite has an $\alpha$-$NaFeO_2$-type layered structure and a space group of R3m, with R≥1.2 where R=I003/I004, wherein I003 and I 004 are the intensities of the 003 and 004 reflections planes in x-ray diffraction pattern, respectively; and wherein the graphene/ternary material composite is prepared by a method comprising the steps of:
(a) mixing a ternary material with a graphene oxide powder in an organic solvent to form a mixed dispersion;
(b) adding a reducing agent to the mixed dispersion from step (a), and carrying out a reduction reaction at a reduction temperature of 80-160° C. while stirring, to obtain a reduction reaction mixture after a reduction time of 60-240 min; and
(c) evaporating the solvent from the reduction reaction mixture from step (b) while stirring, and drying and then annealing the mixture at a temperature of 150-350° C. in an inert atmosphere to obtain a graphene/ternary material composite having a three-dimensional network structure.

2. The graphene/ternary material composite of claim 1, wherein the reducing agent is one or more selected from the group consisting of hydrazine reducing agents, weak acids, phenols, metal hydride reducing agents, strong bases, reducing sugars, alcohols, sodium dithionite, $H_2$ and hydroiodic acid.

3. The graphene/ternary material composite of claim 1, wherein the reducing agent is one or more selected from the group consisting of hydrazine hydrate, dimethyl hydrazine, phenylhydrazine, p-methylsulfonyl hydrazide, ascorbic acid, pyrogallic acid, hydroquinone, tea polyphenol, sodium borohydride, lithium aluminum hydride, sodium hydroxide, potassium hydroxide, aqueous ammonia, glucose, fructose, sucrose, alcohols, sodium dithionite, $H_2$ and hydroiodic acid.

4. The graphene/ternary material composite of claim 1, wherein step (a) further comprises the steps of:
(a1) adding the graphene oxide powder to the organic solvent to obtain a uniformly dispersed graphene oxide dispersion; and
(a2) adding the ternary material to the graphene oxide dispersion to form a mixed dispersion.

5. The graphene/ternary material composite of claim 4, wherein in step (a1), the uniformly dispersed graphene oxide dispersion is obtained by ultrasonic dispersion.

6. The graphene/ternary material composite of claim 4, wherein the graphene oxide dispersion obtained in step (a1) has a concentration of 0.1-5 g/L.

7. The graphene/ternary material composite of claim 4, wherein in step (a2), the ternary material is added to the graphene oxide dispersion in 2-6 portions.

8. The graphene/ternary material composite of claim 4, wherein in step (a2), the ternary material is sufficiently mixed with the graphene oxide by physical mixing to form a mixed dispersion, wherein the physical mixing is one or more selected from the group consisting of stirring, sonication, ball milling, and cell disruption.

9. The graphene/ternary material composite of claim 1, wherein the mass ratio of the ternary material to the graphene oxide is 1:20-1:200.

10. The graphene/ternary material composite of claim 1, wherein the mass ratio of the graphene oxide to the reducing agent is 1:1-1:100.

11. The graphene/ternary material composite of claim 1, wherein the organic solvent in step (a) is one or more selected from the group consisting of ethanol, N-methylpyrrolidone (NMP), N,N-dimethylformamide (DMF), methanol, propanol, isopropanol, n-butanol, ethylene glycol, glycerol, acetone, and n-propanol.

12. The graphene/ternary material composite of claim 1, wherein the reduction reaction mixture is purified before evaporating the solvent from the reduction reaction mixture from step (b) while stirring.

13. The graphene/ternary material composite of claim 1, wherein the annealing in step (c) is conducted at a temperature of 150-300° C.

14. The graphene/ternary material composite of claim 1, wherein the annealing in step (c) is conducted for 1-5 h.

15. The graphene/ternary material composite of claim 1, wherein the annealing in step (c) is carried out in a tube furnace.

16. The graphene/ternary material composite of claim 1, further comprising a pre-treatment prior to step (a), in which the pre-treatment comprises drying the ternary material and the graphene oxide powder at 120-200° C. for 1-3 h.

17. The graphene/ternary material composite of claim 1, wherein the ternary material is one or more of nickel-cobalt-manganese ternary materials.

18. The graphene/ternary material composite of claim 1, wherein the ternary material is one or more selected from the group consisting of nickel-cobalt-manganese ternary materials, nickel-cobalt-aluminum ternary materials, and lithium-rich ternary materials.

* * * * *